(12) United States Patent
Robertson et al.

(10) Patent No.: US 7,114,830 B2
(45) Date of Patent: Oct. 3, 2006

(54) LED REPLACEMENT FOR FLUORESCENT LIGHTING

(75) Inventors: Jonas J. Robertson, Harvey, LA (US); Robert M. Currie, Long Beach, MS (US)

(73) Assignee: Plastic Inventions and Patents, Inc., Saint Laurent (CA)

( * ) Notice: Subject to any disclaimer, the term of this patent is extended or adjusted under 35 U.S.C. 154(b) by 0 days.

(21) Appl. No.: 11/066,302

(22) Filed: Feb. 28, 2005

(65) Prior Publication Data

US 2005/0225979 A1 Oct. 13, 2005

Related U.S. Application Data

(62) Division of application No. 10/196,236, filed on Jul. 17, 2002, now Pat. No. 6,860,628.

(51) Int. Cl.
F21V 1/00 (2006.01)

(52) U.S. Cl. ............... 362/240; 362/217; 362/247; 362/260; 362/800

(58) Field of Classification Search ............ 362/217, 362/223, 240, 241, 247, 260, 800
See application file for complete search history.

(56) References Cited

U.S. PATENT DOCUMENTS

| | | | |
|---|---|---|---|
| 2,713,629 A | 7/1955 | Etzkorn |
| 3,714,414 A | 1/1973 | Sternius |
| 3,755,663 A | 8/1973 | George, Jr. |
| 4,152,618 A | 5/1979 | Abe et al. |
| 4,521,835 A | 6/1985 | Meggs et al. |
| 4,581,687 A | 4/1986 | Nakanishi |
| 4,665,470 A | 5/1987 | George, Jr. |
| 4,748,545 A | 5/1988 | Schmitt |
| 4,901,207 A | 2/1990 | Sato et al. |
| 4,941,072 A | 7/1990 | Yasumoto et al. |
| 4,943,900 A | 7/1990 | Gartner |
| 5,032,960 A | 7/1991 | Katoh |
| 5,515,253 A | 5/1996 | Sjobom |
| 5,688,042 A | 11/1997 | Madadi et al. |
| 5,810,463 A | 9/1998 | Kawahara et al. |
| 6,068,383 A | 5/2000 | Robertson et al. |
| 6,139,174 A | 10/2000 | Butterworth |
| 6,283,612 B1 | 9/2001 | Hunter |
| 6,331,915 B1 | 12/2001 | Myers |
| 6,388,393 B1 | 5/2002 | Illingworth |
| 6,583,550 B1 | 6/2003 | Iwasa et al. |
| 6,682,205 B1 | 1/2004 | Lin |
| 6,860,628 B1 | 3/2005 | Robertson |
| 2002/0060526 A1 | 5/2002 | Timmermans et al. |

(Continued)

Primary Examiner—Stephen F Husar
(74) Attorney, Agent, or Firm—Merek, Blackman & Voorhees, LLC

(57) ABSTRACT

The present invention provides several embodiments of an elongate hollow tubular or solid rod lighting device including a plurality of LEDs therewith and appropriate electrical componentry, and serving as a direct replacement for a conventional fluorescent light tube in a conventional fluorescent lighting fixture. The present lighting device includes appropriate connector pins extending from each end thereof, enabling the device to be installed in a conventional fluorescent lighting fixture with no modification to the fixture. The light may include appropriate electrical componentry such as a step-down transformer to provide the required voltage for the LEDs, either integrally within the light, incorporated in an end cap thereof, or installed separately therefrom in the fixture, as desired. The light may be colored or tinted as desired by the use of LEDs providing the desired color output, and/or by installing a tinted sleeve over the tube or rod as desired.

7 Claims, 7 Drawing Sheets

U.S. PATENT DOCUMENTS

2003/0095399 A1    5/2003    Grenda

2003/0102810 A1 *   6/2003   Cross et al. .................. 315/74

* cited by examiner

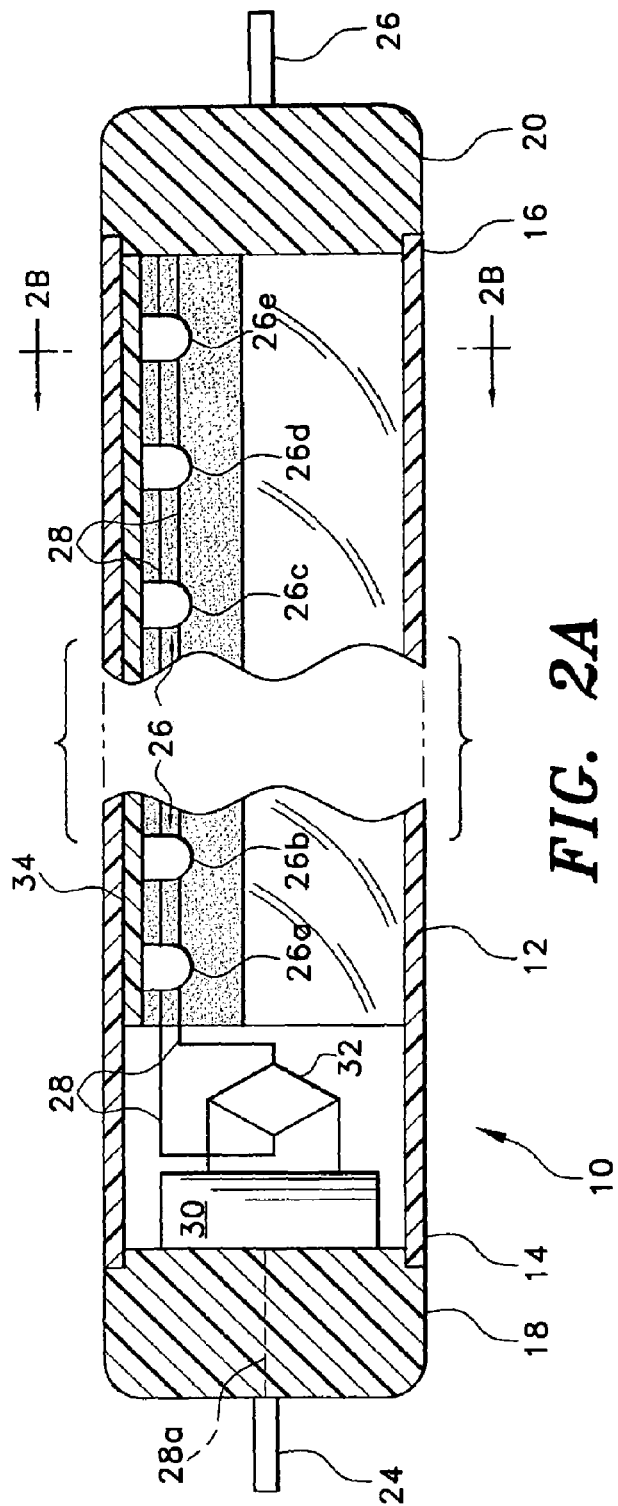
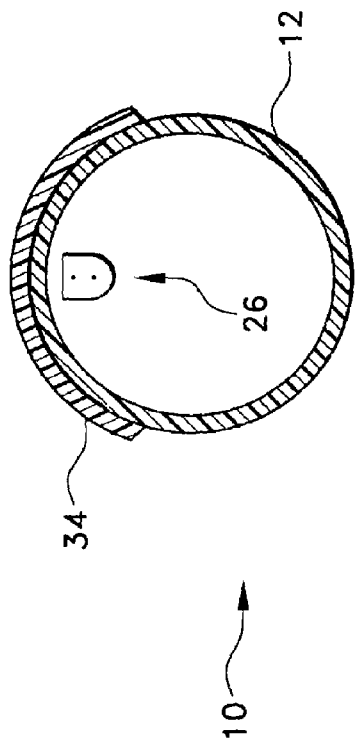

LED REPLACEMENT FOR FLUORESCENT LIGHTING

This application is a divisional of Ser. No. 10/196,236 filed Jul. 17, 2002, now U.S. Pat. No. 6,860,628.

BACKGROUND OF THE INVENTION

1. Field of the Invention

The present invention relates generally to electrical lighting devices and systems, and more particularly to a lighting device comprising a series of light emitting diodes (LEDs) incorporated within a clear or translucent tube or rod configured for installation in a conventional fluorescent light fixture. The present LED replacement light includes suitable light directing and/or diffusing means and compatible connector pins and electrical componentry as required for installation and operation in an existing fluorescent light circuit. Alternatively, the replacement may utilize conventional 110–115 volt alternating current or backup battery power as the electrical power source.

2. Description of the Related Art

A number of different principles of electrical lighting have been developed over the years. Incandescent lighting was the first lighting principle to receive widespread use, and is still the most widely used lighting principle used to date. More recently, the principle of electrically exciting a gas to produce light emission from the gas, has been used to produce usable light in the form of fluorescent lighting fixtures and the like.

Fluorescent lighting operates according to the principle of ionizing a gas contained within a sealed tube. The electrically excited gas produces light emission as it returns to its normal energy level. The light spectrum depends upon the type of gas within the tube, but conventional fluorescent lighting emits light in the ultraviolet spectrum, which is converted to visible light as it encounters the coating within the tube and causes the coating to fluoresce. Such fluorescent lighting also requires a relatively high voltage to produce the required ionization of the gas. This voltage may be provided by a starter which provides an inductive kick when current is shut off or reversed, the ballast serving to limit current in the arc between the filaments, or by high voltage windings loosely wound on the ballast itself in rapid start fluorescent lights.

As can be seen, the fluorescent lighting principle is relatively complex, but is the lighting means of choice in most businesses and the like due to the greater electrical efficiency provided. Nevertheless, repair can be costly in terms of both parts and labor, when ballasts and other components break down and require replacement. Also, the relatively high voltage required of such fluorescent lighting systems requires additional electrical insulation, and requires greater care to provide the degree of safety desired in such electrical devices.

Other principles of lighting have been developed more recently. Among these is the LED, or light emitting diode. Light emitting diodes (hereinafter referred to as "LEDs" throughout the present disclosure) operate generally as a conventional diode, i.e., allowing electrical current to pass through the device in one direction while blocking current flow in the opposite direction. LEDs provide another advantage during this operation, in that the passage of electrical current through the device also causes light to be emitted from the device. As development of such LEDs has progressed, different colors of light emission, light intensity, and other factors have also been developed.

LEDs provide many advantages in lighting, where they may be employed. LEDs are relatively cool in operation, and do not produce any significant amount of heat as a byproduct of their operation. Moreover, they are quite efficient in comparison to other types of lighting principles. LEDs are available in a number of different colors, and the lighting intensity may be varied by means of a simple variable resistor or rheostat, unlike fluorescent lighting. However, even with recently developed "super bright" LEDs, the light output of a single LED is relatively weak in comparison to a conventional fluorescent light unit. Nonetheless, an assembly of a series of LEDs in a single unit or fixture, can provide an equivalent amount of light to a fluorescent light fixture, at greatly reduced voltage requirements and reduced componentry.

Accordingly, the present invention provides a solution to the problem of relatively costly and fragile componentry used in fluorescent lighting, by providing "drop-in" replacement lighting units for fluorescent lighting tubes. The present replacement lighting units comprise various embodiments of cylindrical or tubular units, each containing a relatively large number of LEDs. The lighting units are equipped with support and contact pins which extend from each end of the units and secure in the conventional fluorescent light tube connectors found at opposite ends of every fluorescent light fixture. The present invention also includes the electrical componentry required to adapt the operation of an LED array to the electrical system of a fluorescent lighting fixture, with such electrical componentry being provided either internally within the replacement lighting unit or externally, as desired. The present system may bypass the ballast and starter components of the conventional fluorescent circuit, and may also make advantageous use of a rheostat to control the light and/or color output of the LED device, as desired.

A discussion of the related art of which the present inventor is aware, and its differences and distinctions from the present invention, is presented below.

U.S. Pat. No. 2,713,629 issued on Jul. 19, 1955 to Walter V. Etzkorn, titled "Luminous Bodies," describes a series of embodiments of a relatively small diameter, flexible plastic tube which includes a number of relatively small glass fluorescent bulbs therein. The purpose of the Etzkorn light construction is to provide a lighting device which may serve in place of conventional neon tubes and the like, with the flexible plastic tube and relatively small, spaced apart light bulbs within the Etzkorn construction providing the flexibility required to allow the device to be bent and shaped as desired. This teaches away from the present lighting device, as the present light comprises various embodiments of a rigid, translucent tube or rod adapted for installation in a conventional fluorescent lighting fixture. An attempt to install the flexible lighting unit of Etzkorn in a conventional overhead fluorescent lighting fixture, would result in the Etzkorn fixture sagging of its own weight as it spanned the opposite fluorescent sockets of the fixture. Moreover, Etzkorn clearly does not anticipate such a use for his device, as he only describes its connection with a conventional household wiring circuit (col. 2, lines 45–46). As Etzkorn utilizes relatively high voltage components, i.e., fluorescent bulbs, he does not require means for reducing system voltage, as provided by the present invention. Also, it is noted that Etzkorn wires his fluorescent bulbs in parallel, so that the loss of a single bulb does not result in the entire display going out. In contrast, the present invention connects the individual LEDs in series. In this manner, each LED may act as a voltage reduction device for other LEDs in the circuit.

As LEDs are extremely reliable, solid state devices, such a series circuit is still highly reliable in comparison with series circuits using devices operating by means of other principles.

U.S. Pat. No. 3,714,414 issued on Jan. 30, 1973 to Alf T. Sternius, titled "Ornamental Lighting Means," describes a series of embodiments incorporating baseless miniature (incandescent) lamps or bulbs, arranged in series in a holding fixture of some sort. The problems with such incandescent units, i.e., heat, relatively short life, high current draw for the amount of light output, etc., are well known. Sternius only provides a conventional connector plug for electrically connecting his lighting apparatus to a conventional outlet. He clearly does not anticipate using his lighting device in a fluorescent light fixture, with its specially configured sockets, as he does not provide any means of stepping down the voltage of such a fluorescent fixture to that required for his incandescent lights.

U.S. Pat. No. 3,755,663 issued on Aug. 28, 1973 to Ben B. George, Jr., titled "Electrical Display Device And Method Of Making The Same," describes various embodiments of a lighting device incorporating a number of small, baseless incandescent bulbs in a series-parallel circuit within a flexible plastic tube or sleeve. George, Jr. does not disclose any connector means configured for connecting to a conventional fluorescent light fixture, as provided by the present lighting system invention. The George, Jr. lighting system thus more closely resembles the system of the '629 U.S. patent to Etzkorn and certain embodiments of the '663 U.S. patent to Sternius, both discussed above, than it does the present invention.

U.S. Pat. No. 4,152,618 issued on May 1, 1979 to Osamu Abe et al., titled "Light-Emitting Display Device Including Light Diffusing Film," describes an assembly including a relatively small light emitting element. The disclosure is not clear as to the principle of operation of the light emitting element, but it appears that an early light emitting diode device is described, at least very generally. However, Abe et al. are primarily concerned with various means for diffusing the light emitted from the light emitting device, rather than with any specific means for replacing an existing lighting device (e.g., a fluorescent tube) with a lighting device incorporating a number of light emitting diodes therein, as is the case with the present invention. Accordingly, no specific electrical connection means is disclosed by Abe et al.

U.S. Pat. No. 4,521,835 issued on Jun. 4, 1985 to Daniel H. Meggs et al., titled "Flexible Elongated Lighting System," describes various embodiments of a lighting system employing a number of LED type lighting devices imbedded within a flexible plastic rod or the like. Meggs et al. describe a number of different internal shapes for the plastic rod, for transmitting or diffusing the light output of the LEDs. Meggs et al. are primarily concerned with emergency lighting systems, and include battery power for their lighting systems. However, they do not provide any means for replacing an existing fluorescent lighting unit with their LED light system, as opposed to the present invention which includes voltage reduction and compatible connection means for replacing a fluorescent tube with a unit of the present invention.

U.S. Pat. No. 4,581,687 issued on Apr. 8, 1986 to Hirobumi Nakanishi, titled "Lighting Means For Illuminative Or Decorative Purpose And Modular Lighting Tube Used Therefor," describes a series of embodiments of tubular lighting elements employing numerous LED lights therein, in series array. However, Nakanishi states that his lighting elements are flexible, and thus they are not suited for installation across the span of a fluorescent light fixture, as provided by the present rigid lighting elements. Moreover, Nakanishi utilizes end connectors which are incompatible with the conventional sockets found in a fluorescent lighting fixture, and Nakanishi does not disclose any electrical apparatus for reducing the voltage from the higher voltage of a fluorescent fixture or even standard household alternating current, as provided by the present invention.

U.S. Pat. No. 4,665,470 issued on May 12, 1987 to Benjamin B. George, Jr., titled "Decorative Light Tubing And Method Of Manufacture Thereof," describes the use of a transparent dielectric material which is poured into the light tube in a liquid state, to seal the lighting components therein. George, Jr. describes the bending of the electrical contact wires over the edges of the ends of the tube, to hold them in place. Such a configuration is not at all compatible with installation in a conventional fluorescent light fixture. George, Jr. does not anticipate such an installation for his lighting device, as he does not disclose any electrical componentry to adapt the relatively low power requirements of LED lighting to the high voltage of a fluorescent lighting system.

U.S. Pat. No. 4,901,207 issued on Feb. 13, 1990 to Naoki Sato et al., titled "Light Emission Element Array And Manufacturing Method Thereof," describes a linear LED array having a converging lens with a cylindrical cross section installed thereover. The Sato et al. disclosure is directed primarily to means for roughening the external surface of the cylindrical lens in order to diffuse the light emanating therefrom, rather than dealing with any specific installation configuration for an LED array. Accordingly, Sato et al. do not disclose any form of physical connection means for their lighting apparatus, nor any electrical components for adapting an LED array to a fluorescent lighting fixture, as provided by the present invention.

U.S. Pat. No. 4,941,072 issued on Jul. 10, 1990 to Masami Yasumoto et al., titled "Linear Light Source," describes a linear LED array and semicylindrical section lens therefor. As in the case of the '207 U.S. patent to Sato et al. discussed immediately above, Yasumoto et al. do not disclose any specific means for securing their lighting device in any form of fixture, fluorescent or otherwise, and do not disclose any form of electrical apparatus for adapting the relatively low voltage requirements of an LED circuit to the necessarily higher voltage of a fluorescent fixture or even conventional line current, as provided by the present LED replacement for fluorescent lighting invention.

U.S. Pat. No. 4,943,900 issued on Jul. 24, 1990 to Klaus Gartner, titled "Lighting Fixture," describes a number of miniature incandescent bulbs electrically connected in series within a translucent tube. Gartner is directed particularly to end attachment means for his lighting tube, with each end connector comprising a male connector which fits into a female socket in the end of the tube. Each end of the Gartner tube contains only a single electrical conductor. The Gartner lighting device is thus incompatible with a fluorescent fixture, with its requirement for two parallel male electrical connector pins extending from each end of the lighting element, as provided by the present LED replacement device for fluorescent lighting.

U.S. Pat. No. 5,032,960 issued on Jul. 16, 1991 to Masaaki Katoh, titled "Light Source Device With Arrayed Light Emitting Elements And Manufacturing Therefor," describes an LED lighting array comprising a linear group of LEDs installed beneath a semicylindrical converging lens. The Katoh configuration more closely resembles the lighting arrays of the Sato et al. '207 U.S. patent, and more particularly the Yasumoto et al. '072 U.S. patent, than it does the present invention. Katoh does not disclose any means for connecting his lighting array electrically or physically with a lighting fixture, and does not disclose any electrical apparatus for adapting his LED array for use in a conventional fluorescent lighting fixture, as provided by the present LED replacement lighting device.

U.S. Pat. No. 5,515,253 issued on May 7, 1996 to Fritz C. Sjobom, titled "L.E.D. Light Assembly," describes a specific lens configuration for diffusing the light produced by an LED lighting array. Sjobom provides a plurality of LEDs on a circuit board, and overlays the assembly with his lens. The Sjobom LED lighting array is not installed within a hollow translucent tube nor disposed along a solid translucent rod, as is the case with the present LED lighting apparatus. Moreover, Sjobom does not disclose any form of end connectors for his lighting array, nor does he disclose any electrical apparatus for adapting an LED array for use with the higher voltage of a conventional fluorescent lighting system or 110–115 volt AC supply, as provided by the present LED replacement for fluorescent lighting invention.

U.S. Pat. No. 5,688,042 issued on Nov. 18, 1997 to Abolfazl Madadi et al., titled "LED Lamp," describes an elongate bulb having an attachment base at only one end thereof. The lamp includes three elongate circuit boards, each having a series of LEDs installed thereon. The circuit boards are installed within the bulb to emit light in a general omnidirectional pattern. Madadi et al. do not provide any form of reflector or diffuser means with their light, as they intend it to be installed within a double faced, back lighted sign (e.g., exit signs, etc.). Moreover, as they intend their light to be used only in such relatively compact installations, they do not provide the conventional double parallel pin connectors at each end of the bulb, as is provided in the present LED replacement lighting.

U.S. Pat. No. 5,810,463 issued on Sep. 22, 1998 to Atsushi Kawahara et al., titled "Illumination Device," describes an LED lighting device having either a row of LEDs which send their light through a generally cylindrical lens with reflectors thereon, or which may include an array of LEDs at one end of the lens. The lens of the Kawahara et al. lighting device includes a lateral extension, the end or edge of which is adjacent to the linear LED array. This shape is not compatible with installation within a conventional fluorescent light fixture, as provided by the present invention. Moreover, Kawahara does not disclose any electrical apparatus to provide compatibility with the relatively high voltages of a fluorescent lighting system or even conventional household supply current, as provided by the present invention.

U.S. Pat. No. 6,068,383 issued on May 30, 2000 to Roger Robertson et al., titled "Phosphorous Fluorescent Light Assembly Excited By Light Emitting Diodes," describes a fluorescent lighting device which produces light in the visible spectrum by means of a fluorescent coating within the lighting apparatus, which in turn is excited by ultraviolet light produced by a number of LEDs within the device. The device of the Robertson et al. '383 U.S. patent is thus more closely related to a conventional fluorescent lighting assembly, than to the present invention. The only difference between the assembly of the Robertson et al. '383 U.S. patent and conventional fluorescent fixtures, is that conventional fluorescent lighting produces light in the ultraviolet spectrum by means of ionizing a gas within a tube, with the ultraviolet light produced by the ionized gas causing the fluorescent coating within the tube to fluoresce to produce light in the visible spectrum. The present invention does not produce any form of ultraviolet light; all light produced by the LEDs used in the present lighting apparatus, comprises light in the visible spectrum. There is no need to convert light from the ultraviolet spectrum to the visible spectrum, in the present lighting system invention. Moreover, the Robertson et al. '383 U.S. patent does not disclose any physical configuration for a lighting device which enables it to be installed within a conventional fluorescent lighting fixture, as provided by the present LED replacement for fluorescent lighting invention.

U.S. Pat. No. 6,139,174 issued on Oct. 31, 2000 to Mark M. Butterworth, titled "Light Source Assembly For Scanning Devices Utilizing Light Emitting Diodes," describes a solid translucent rod which accepts blue light from an appropriate LED at one end thereof, and transmits the light outwardly through the side of the rod. A pair of fluorescent strips along the side of the rod produce light in different spectra, with a third strip passing the blue light therethrough. The Butterworth light apparatus is adapted for use in a scanning device, as are many of the lighting devices of the prior art discussed further above. Accordingly, no means of installing or operating the Butterworth apparatus in a conventional fluorescent lighting fixture, is disclosed.

U.S. Pat. No. 6,283,612 issued on Sep. 4, 2001 to Mark A. Hunter, titled "Light Emitting Diode Light Strip," describes an elongate translucent tube with a plurality of LEDs installed in series therein. However, Hunter utilizes a separate power supply to step down the voltage from the conventional 110–220 volt supply to the reduced voltage required even for a series of LEDs. The Hunter power supply is a separate box, wired in series with the light by an elongate flexible cable and removable connector. Moreover, each end of the Hunter lamp includes a flexible cable extending therefrom, which is not compatible for installation in a conventional fluorescent light fixture. In addition, Hunter does not disclose any form of light reflecting or diffusing means for scattering the directional light of the LEDs in through a wide spread pattern, as provided by the present invention.

U.S. Pat. No. 6,331,915 issued on Dec. 18, 2001 to Kenneth J. Myers, titled "Lighting Element Including Light Emitting Diodes, Microprism sheet, Reflector, And Diffusing Agent," describes sheet(s) of material having of a series of prismatic reflective grooves formed therein, and the placement of LEDs along the grooves. A number of additional means of diffusing or scattering the light emitted by the LEDs, is also described generally by Myers. However, the only electrical power source indicated in the Myers disclosure, is a conventional symbol for a battery across two of the LEDs in one of the drawing Figs. No description of this battery, its reference numeral, or any other electrical power means is provided in the text of the disclosure.

U.S. Pat. No. 6,388,393 issued on May 14, 2002 to Lewis Illingworth, titled "Ballasts For Operating Light Emitting Diodes In AC Circuits," describes various embodiments of inductor and transformer devices for reducing voltage and current to proper levels, for powering LED lighting devices in an aircraft electrical system. Illingworth does not describe any type of connectors for connecting an LED light array in a fluorescent fixture, nor does he describe any means for reflecting or diffusing the light output from an LED array, which features are a part of the present invention. Moreover, Illingworth is directed to relatively low voltages, and particularly DC electrical power systems, as used in aircraft.

Accordingly, he teaches away from the present invention, with its "drop-in" replacement in a fluorescent lighting fixture.

Finally, U.S. Patent Publication No. 2002/60,526 published on May 23, 2002 to Jos Timmermans et al., titled "Light Tube And Power Supply Circuit," describes an elongate tube having a plurality of LEDs installed therein. Timmermans et al. also describe circuitry and connector means for installing their light in an existing fluorescent light fixture. However, Timmermans et al. vary the angles of their installed LEDs to provide the desired light projection. No light reflective or diffusion means is disclosed by Timmermans et al. in their light.

None of the above inventions and patents, taken either singularly or in combination, is seen to describe the instant invention as claimed. Thus an LED replacement for fluorescent lighting solving the aforementioned problems is desired.

SUMMARY OF THE INVENTION

The present invention comprises a series of embodiments of a replacement lighting unit for a conventional high voltage fluorescent lighting fixture, with the present lighting device utilizing a number of relatively low voltage light emitting diodes (LEDs) to produce the desired light. The LEDs are disposed linearly within a translucent tube, along the outer surface of a solid translucent rod, or grouped at one or both ends of such a solid rod. The LEDs may be in a series or parallel circuit array, as desired. A series circuit works well, as the reliability of such LED devices is such that it is unlikely that any will break down, which would result in loss of the entire series circuit. Moreover, a series circuit of LEDs allows the LEDs to act as a series of mutual voltage reduction devices for the other LEDs in the series circuit, thus reducing or eliminating any additional electrical componentry which might otherwise be required.

The translucent tube or rod of the present invention which contains the LEDs, is equipped with fluorescent light receptacle attachment pins at each end thereof, in the manner of a conventional fluorescent tube. It is not necessary for both sets of pins in each end to be electrically conductive; only a single pair of pins in one end of the device need supply electrical power from the fixture to the LEDs and other electrical componentry, if so desired. Additional circuitry, e.g., a transformer, may be built into the translucent tube or installed at one end of the translucent rod, as desired.

Both the solid rod and hollow tube embodiments preferably incorporate some form of reflective material disposed about approximately one half of the circumference of the rod or tube, in order to transmit the light laterally from one side of the rod or tube. The reflective material may be formed integrally with the rod or tube at the time of manufacture, e.g., by an extruding or other process. A tinted translucent sleeve may be applied over the rod or tube if so desired, and/or the LEDs may be selected to emit a given color, in order to provide light output in a desired color range. The use of LEDs allows their intensity to be adjusted as desired by means of a conventional rheostat or similar control, unlike conventional fluorescent lights.

Accordingly, it is a principal object of the invention to provide a lighting device using the LED lighting principle for use as a direct replacement for a fluorescent tube in a conventional fluorescent lighting fixture, including any and all required electrical components to provide electrical compatibility and the required connector pins for physical compatibility with a conventional fluorescent light fixture.

It is another object of the invention to provide such a replacement light unit which may utilize a hollow translucent tube containing a plurality of LEDs therein, or which may utilize a solid translucent rod having a plurality of LEDs installed linearly therealong or grouped at one or both ends thereof.

It is a further object of the invention to provide such a replacement light device which may incorporate the required electrical components for compatibility integrated within the device, or disposed externally to the device within the lighting fixture.

Still another object of the invention is to provide such a replacement lighting device which may include reflective means for distributing and diffusing the light output as desired, and/or tinting and/or LEDs which provide colored light output, for coloring the light output of the device as desired.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 2A is an elevation view in section of a hollow translucent tubular embodiment of the present LED replacement light, showing its configuration and componentry.

FIG. 2B is an end elevation view in section of the LED replacement light of FIG. 2A, showing further details thereof.

Similar reference characters denote corresponding features consistently throughout the attached drawings.

DETAILED DESCRIPTION OF THE PREFERRED EMBODIMENTS

Figure 1:
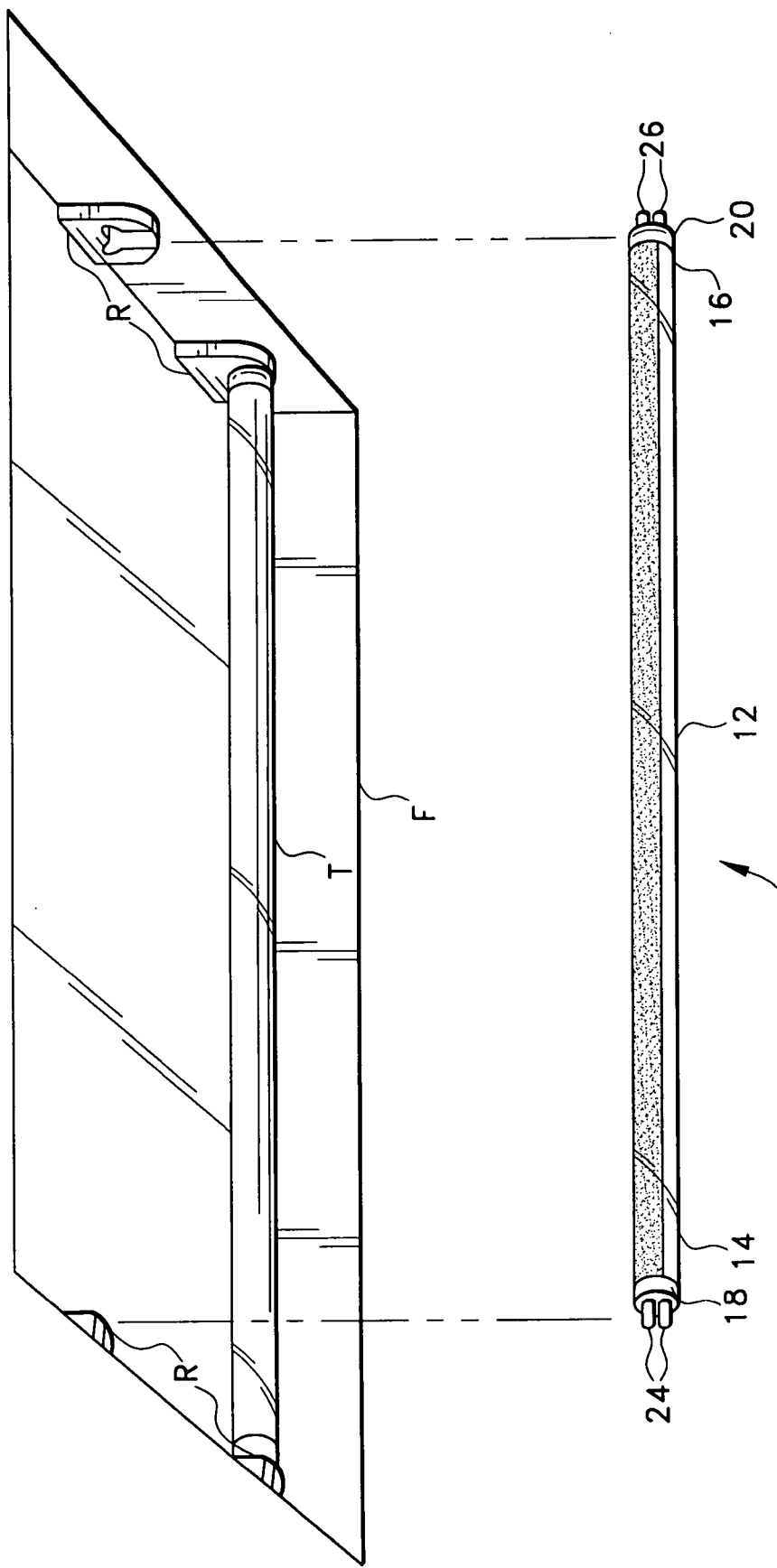
FIG. 1 is an exploded environmental perspective view showing the installation of an LED replacement light unit of the present invention in a conventional fluorescent light fixture.

The present invention comprises various embodiments of a lighting element adapted for installation in a conventional fluorescent lighting fixture. The present lighting element contains one or more (preferably a plurality of) light emitting diodes (LEDs) therein, which provide the light emission from the device. FIG. 1 of the drawings illustrates the installation of a first embodiment LED replacement lighting device 10, within an existing conventional fluorescent lighting fixture F. The fluorescent lighting fixture F is adapted to receive one or more elongate, tubular fluorescent lighting tubes T therein, with the tubes T being secured between opposed electrical receptacles R. While the fluorescent fixture F illustrated in FIG. 1 comprises an overhead fixture containing two straight, elongate tubes or lighting elements, it will be seen that the present LED replacements for fluorescent lighting are adaptable to virtually any configuration of fluorescent lighting element, e.g., U-shaped, toroidal, etc.

FIGS. 2A and 2B provide details of the construction of the LED replacement lighting element 10 shown generally in FIG. 1. The lighting element 10 comprises a hollow, rigid, translucent tube 12 having opposite first and second ends, respectively 14 and 16. The tube 12 may be formed of any optically transparent or clear material, or may be tinted as desired or may include a tinted sleeve (discussed further below) installed therearound. A relatively sturdy plastic is the preferred material, but other materials (glass, etc.) may be used to form the tube 12 as desired.

First and second end caps, respectively 18 and 20, are installed upon the respective first and second ends 14 and 16 of the tube 12. Each of the end caps 18 and 20 has a pair of parallel fluorescent light fixture receptacle connectors extending therefrom, with end cap 18 having connectors 22 and end cap 20 having connectors 24 extending therefrom. Each connector of each pair of connector pairs 22 and 24 is parallel to the other in its pair (and coaxial with the corresponding connector of the opposite connector pair), with the connectors 22 and 24 being configured for removably installing within the conventional opposed electrical receptacles R of a fluorescent lighting fixture F, as shown in FIG. 1. Again, other configurations of the present lighting device may be provided to conform to other fluorescent lighting installations.

A series of light emitting diodes (LEDs) 26, designated as individual LEDs 26a, 26b, 26c, etc., is installed within the hollow tube 12. The LEDs 26 are electrically connected to one another by suitable means (e.g., wiring 28, elongate circuit board or flex circuit to which the LEDs are installed, etc.) and to an appropriate electrical power source. Preferably, the LEDs 26 are connected in series, as each LED acts as a voltage reducer for others in the circuit. This reduces the transformer differential which would otherwise be required to reduce the voltage for the LED array. The use of a series circuit which would terminate power to all of the LEDs in the event of a single LED failure, is not seen to be a problem. LEDs are sufficiently reliable that the loss of even a single LED in the circuit, is extremely unlikely.

LEDs conventionally require relatively low voltage, on the order of three volts per diode unit, even at their maximum light output. However, the typical fluorescent lighting fixture operates from a 115 volt wall outlet, and may have high voltage windings to produce enough potential to ionize the gases within the fluorescent tube. It will be seen that some form of step down transformer is required with the present LED lighting device, unless a very large number of LED devices 26 is installed in series within the replacement tube 12.

Accordingly, a step-down transformer 30 is provided with the lighting device 10. The transformer 30 may be installed within the lighting device 10 somewhere between the two end caps 18 and 20, or may alternatively be provided externally to the device 10, if so desired. If the transformer 30 is installed within the device 10, it may be installed in one end of the tube 12, adjacent to one of the end caps (e.g., end cap 18, in FIG. 2A), or may be installed within a hollow end cap, as desired. The transformer 30 need not be excessively bulky, as the amperage it must handle is relatively low for a series of LEDs, and thus such a small transformer 30 easily fits within the interior of the lighting device 10.

The transformer 30 receives electrical power from the contact pins 24, by connecting wiring 28a passing through the end cap 18. No electrical connection is required for the opposite pins 26; they serve merely to provide physical support for the opposite end of the tube 12. Electrical current flows through one of the two parallel connectors 24 to the transformer 30, to the LEDs 26, and back through the return circuitry to the opposite pin 24.

FIG. 2A also illustrates a bridge rectifier circuit 32 installed within the tube 12, adjacent to the transformer 30. It will be seen that when using LEDs as the lighting principle for the present invention, that such a rectifier 32 is not required. The LEDs themselves, being diode devices, automatically rectify any alternating current supply. However, a rectifier circuit 32 may be provided with the present lighting device, if so desired.

The clear or translucent tube 12 of the lighting device 10, may be colored or tinted as desired to produce any given shade or color of light as desired. Alternatively, or in addition to such tinting, at least some of the LEDs themselves may be selected to emit a specific color or wavelength of light, as desired. It is anticipated that most applications of the present invention would be best suited by the use of so-called "super bright" white LEDs, due to the broad range of color output across the spectrum and also due to their efficiency and relatively high light output. However, any type of LED desired may be used in the present lighting device.

In order to provide further efficiency, some form of reflector 34 disposed along the upper surface of the tube 12, is also desirable. The reflector 34 may be a coating comprising a white, silver, or other color paint, tape, overlay, etc. disposed internally (FIG. 2A) or externally (FIG. 2B) about a portion of the circumference of the tube 12, as desired. This reflector 34 is preferably disposed about the upper portion of the tube 12 in an overhead lighting array, in order to reflect the light outwardly and downwardly from the fixture F.

Figure 3A:
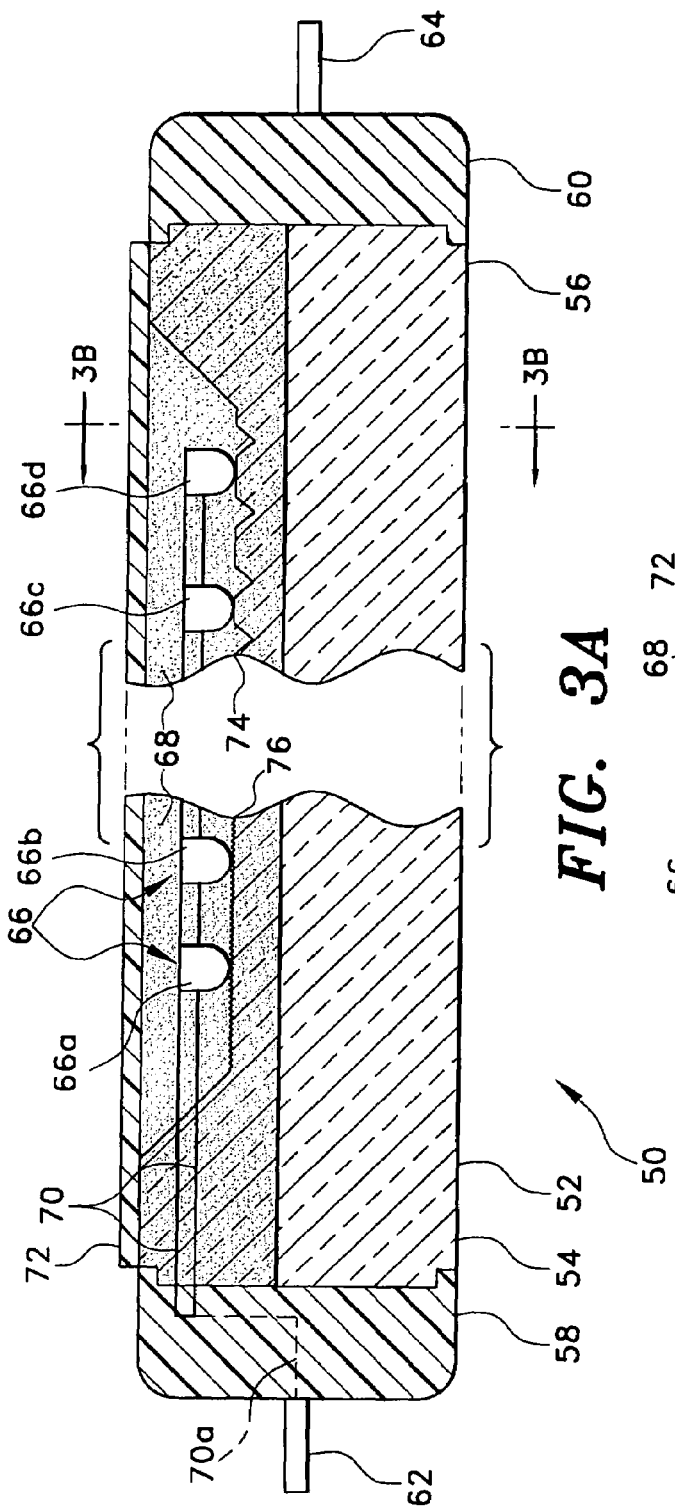
FIG. 3A is an elevation view in section of a solid translucent rod embodiment of the present LED replacement light, showing its configuration and componentry.
Figure 3B:
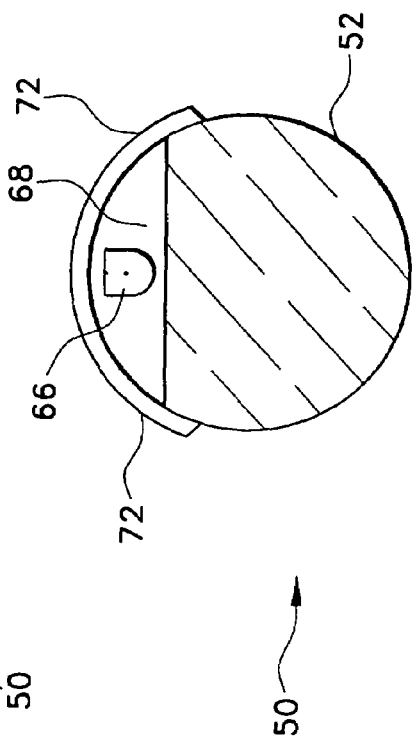
FIG. 3B is an end elevation view in section of the LED replacement light of FIG. 3A, showing further details thereof.

FIGS. 3A and 3B illustrate a second embodiment of the present invention, comprising lighting device 50. The elongate element of the light 50 is formed as a solid, rigid, transparent or translucent rod 52 of suitable material (plastic, glass, etc.), having opposite first and second ends, respectively 54 and 56. Each end is equipped with an end cap, respectively 58 and 60, with corresponding fluorescent fixture receptacle connector pins, respectively 62 and 64, extending from each end cap 58 and 60. Excepting the fact that the elongate element comprises a solid rod 52 rather than a hollow tube, as in the embodiment of FIGS. 2A and 2B, the basic configuration of the lighting element 50 is much like that of the lighting element 10 of FIGS. 2A and 2B, being adapted for installation in a conventional fluorescent lighting fixture.

A series of white or colored light emitting diodes 66, comprising LEDs 66a, 66b, 66c, etc., is provided for the lighting device 50. However, the LEDs 66 are installed in a depression 68 (or series of depressions or receptacles, one for each LED) formed in the exterior of the solid rod 52, along one side thereof. Suitable electrical connection means 70 is provided between each of the LEDs 66a, 66b, etc., and further electrical connection means 70a between the LEDs 66 and the connector pins 62. The electrical circuitry required for the operation of the LEDs 66 may be installed externally to the transparent or translucent rod 52, or within a hollow end cap or hollowed end of the rod 52, but is essentially the same as that illustrated in FIG. 2A of the drawings and described further above.

As in the light 10 of FIGS. 2A and 2B, the light 50 may also include some form of reflective coating 72 (reflective paint, tape, sheathing, etc.) applied along a portion of the circumference of the rod 50, and extending over the LEDs within their receptacle or receptacles 68. In addition, some form of light diffusing means is desirable in the solid rod embodiment 50 of the present invention, and may comprise a series of V-shaped or other shaped notches 74 (shown to the right side in FIG. 3A, or a relatively fine grating 76 (to the left, in FIG. 3A), or other irregularities disposed over the surface of the LED receptacle(s) 68, so long as the means provided is sufficient to diffuse the light as desired.

Figure 4:
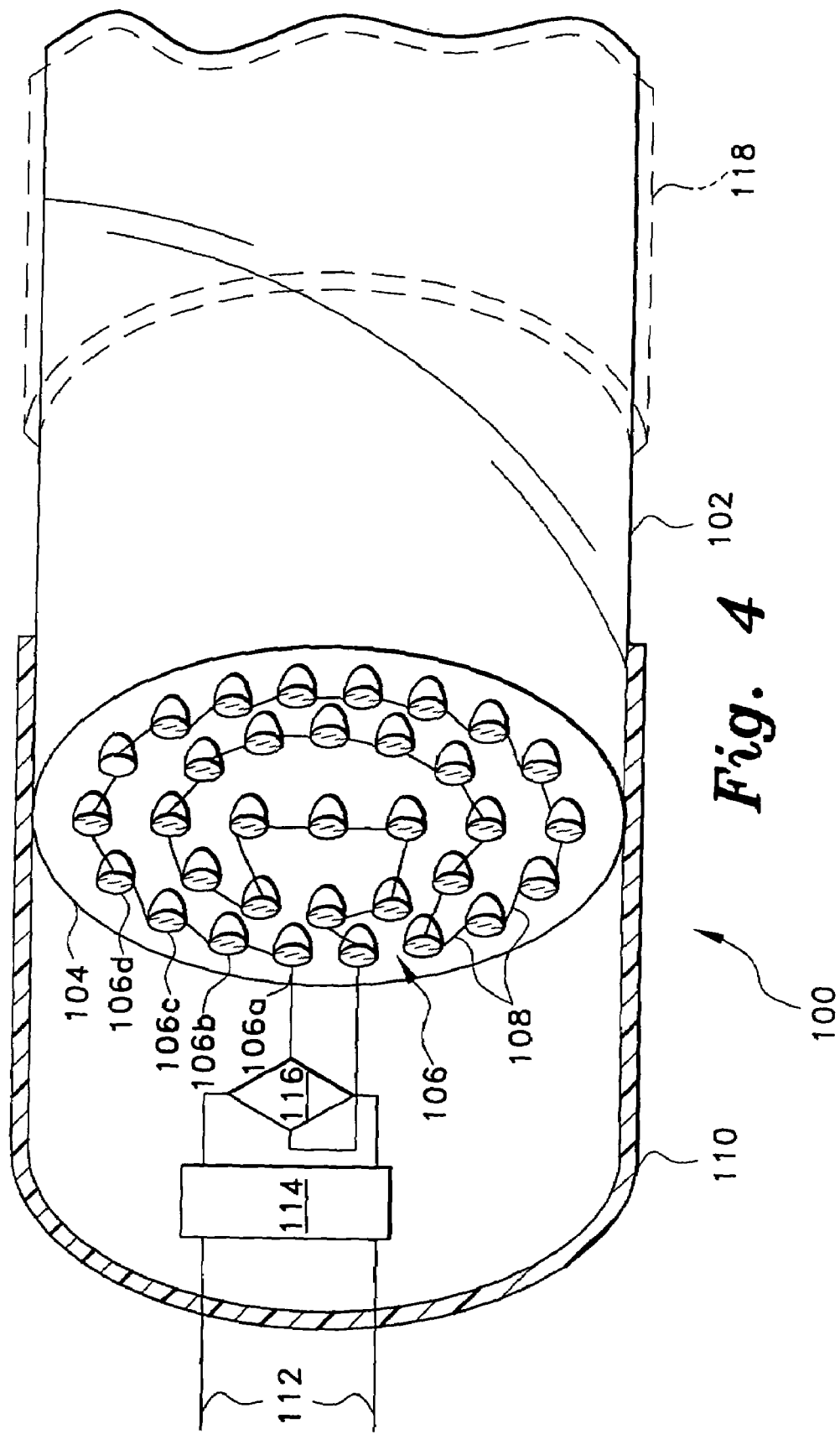
FIG. 4 is a detailed perspective view in section of one end of the solid rod embodiment, showing the installation of a series of LEDs at one end thereof and schematic electrical componentry.

FIG. 4 illustrates one end of another alternative embodiment lighting device of the present invention. The light 100 of FIG. 4 comprises a rigid, solid, transparent or translucent rod 102, similar to the rod 52 of FIGS. 3A and 3B. While only a first end 104 of the lighting element 100 of FIG. 4 is shown, it will be understood that the general configuration of the light 100 closely resembles that of the light 50 of FIGS. 3A and 3B. However, rather than having a series of LEDs disposed in a receptacle or receptacles formed along one side of the rod, the translucent rod 100 of FIG. 4 includes a plurality of LEDs 106, comprising LEDs 106a, 106b, 106c, etc., connected in series by wiring 108 and installed beneath a hollow first end cap 110. The end cap 110 has connector pins 112 (shown schematically) extending therefrom and may also include therein the transformer 114 and optional rectifier 116 circuitry for the operation of the LEDs 106, as desired.

As in the cases of the earlier discussed embodiments of the present invention, the LEDs 106 of the lighting device 100 of FIG. 4 may emit white light, or light of any color of the spectrum as desired. Alternatively, a tinted sleeve 118 (shown in broken lines in FIG. 4) may be installed over the transparent or translucent rod 102, to provide the desired color or tint for the light output of the device 100.

Figure 5:
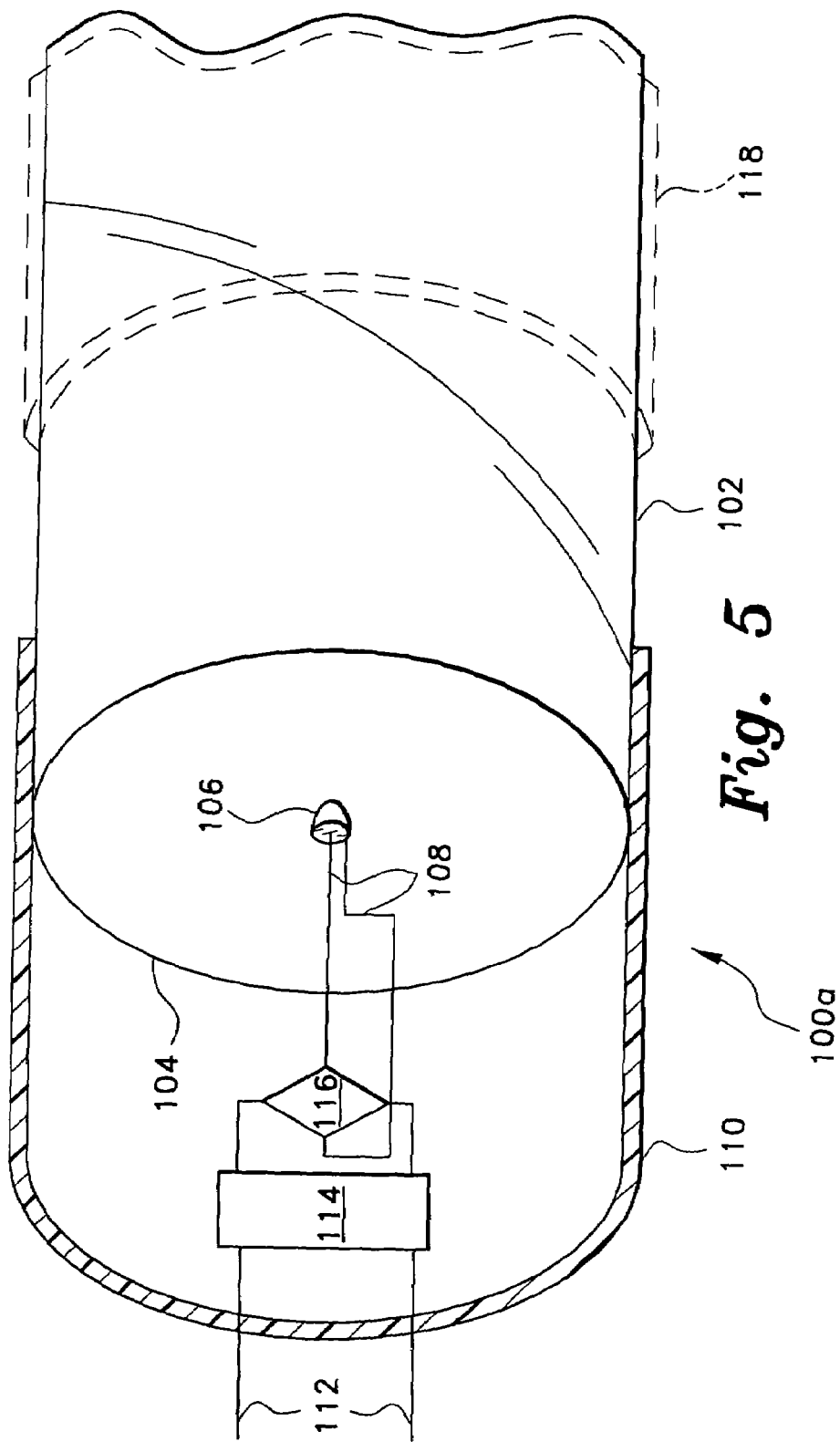
FIG. 5 is a detailed perspective view in section of an alternative embodiment of the solid rod of FIG. 4, showing the installation of a single LED therein.

The light embodiment 100a of FIG. 5 is quite similar to the embodiment 100 of FIG. 4, comprising a solid, transparent or translucent rod 102 having opposite ends and end caps (the first end 104 and end cap 110 are shown). The end cap 110 may contain the required electrical circuitry, i.e., transformer 114 and optional rectifier bridge 116, which receive their electrical energy from a pair of connector pins 112. An optional tinted or translucent sleeve 118 may be installed over the rod 102, as desired. However, the embodiment 100a of FIG. 5 differs from the embodiment 100 of FIG. 4, in that only a single LED 106 is installed at the end 104 of the rod 102 for the light device 100a of FIG. 5. Where "super bright" LEDs are used with relatively small and/or shorter light rods (or tubes), such a single LED installation may be sufficient, if an LED having sufficient light output is installed. It will also be seen that a single LED (or plural LEDs) may be installed at the opposite ends of the lighting device, if so desired.

Figure 6:
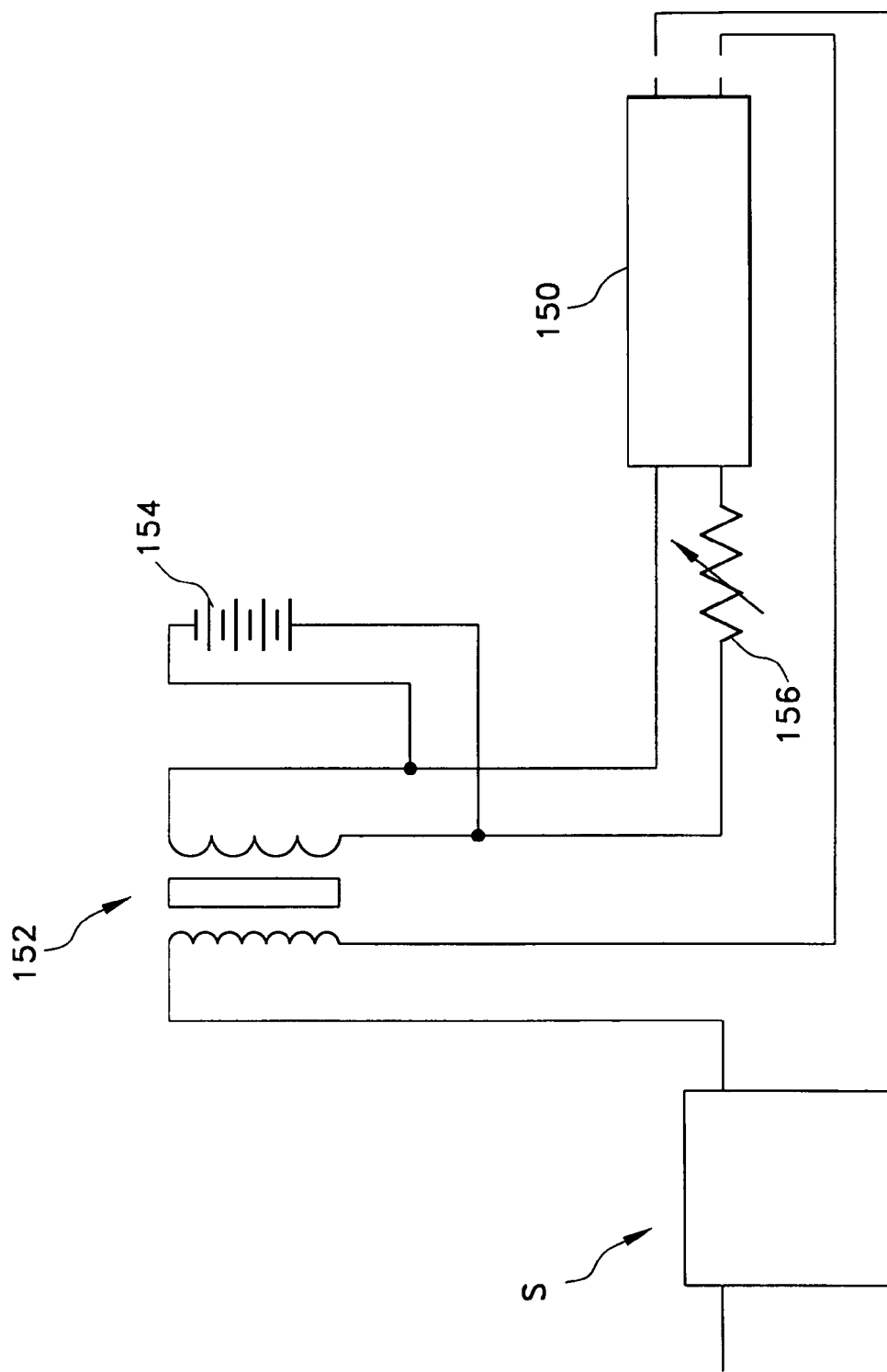
FIG. 6 is an electrical schematic, showing a step-down transformer in series with a conventional fluorescent light ballast, and other features.
Figure 7:
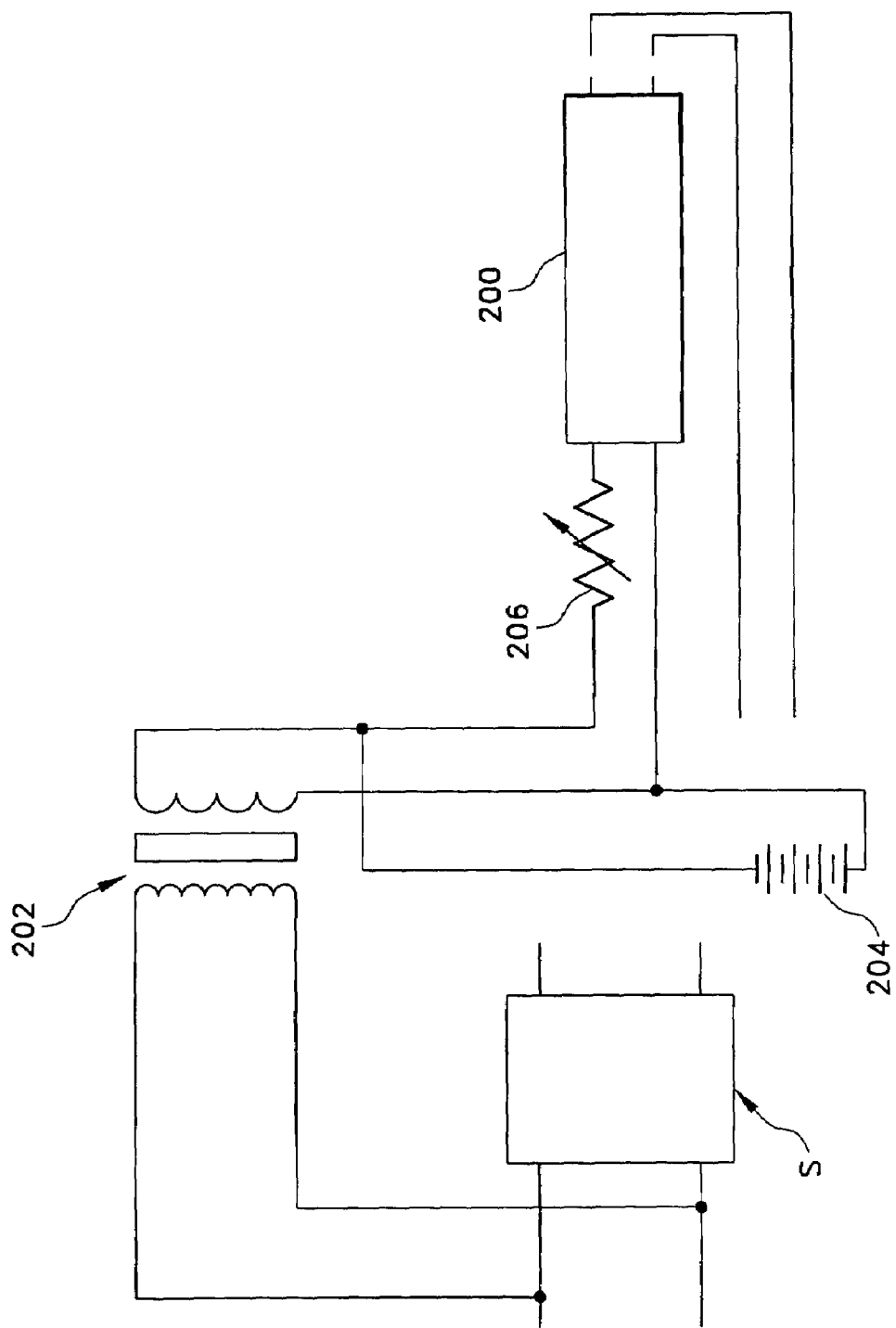
FIG. 7 is an electrical schematic, showing a step-down transformer bypassing the conventional fluorescent light ballast, and other features.

FIGS. 6 and 7 disclose schematic drawings of alternative electrical systems which may be used with the present lighting device invention embodiments. FIG. 6 illustrates an exemplary system for a light 150 having an integral step-down transformer 152 therewith. In FIG. 6, the conventional ballast S or a starter provides voltage to the lighting circuit at a somewhat higher level than that of the conventional supply voltage, as is known in the art of fluorescent lighting. The step-down transformer 152 may be installed integrally within one end of the lighting device 150, in series with the ballast S, as in the lighting device 10 of FIG. 2A, or lights 100 and 100a of FIGS. 4 and 5. This provides for a direct, "drop-in" LED lighting element for replacing a conventional fluorescent lighting tube, without requiring modification to the electrical system of the fluorescent lighting fixture.

As the LED circuitry of the present lighting system embodiments requires relatively low electrical power for operation, it is feasible to operate such an LED replacement lighting system by means of electrical storage cell or battery power, if desired. Preferably, such a back-up battery system 154 receives electrical power through a conventional charging system (not shown) and utilizes conventional automatic switching means (not shown) to automatically activate the LED lighting system in the event the standard electrical supply power is interrupted. (It will be noted that the electrical circuitry for the battery backup shown in FIGS. 6 and 7, is greatly simplified, with many components omitted.)

The use of LEDs to supply lighting for an area, provides numerous advantages over fluorescent lighting systems. Among these advantages is the ability to control the light output level of the LED lighting system by varying the voltage to the lighting device. This may be accomplished by means of a conventional variable resistor or rheostat type switch 156, as is known in the art of light dimmer devices. The installation of such a dimmer switch 156 at the light switch, allows voltage to the conventional fluorescent light ballast S to be varied, which in turn varies output voltage to the step-down transformer 152 of the system, thereby varying the light output of the LEDs in the system. While such a system is not workable where a fluorescent light is installed to use the same voltage and current regulating ballast, such a system is feasible where only LED lighting devices are installed, or LED lighting in combination with conventional incandescent lights.

The lighting system schematic of FIG. 7 differs from that of FIG. 6, in that the lighting device 200 is powered by a step-down transformer 202 which is connected "upstream" of the conventional ballast S, which has been disconnected from the lighting circuitry. In this manner, the voltage differential required between input and output sides of the transformer 202 is reduced. However, such an installation would require rewiring of the fluorescent lighting fixture to bypass the existing fluorescent light ballast device. As in the lighting system of FIG. 6, a backup battery 204 and rheostat 206 are provided, with the actual circuitry required for their interface with the system, not being shown.

In conclusion, the present LED replacement lighting devices for fluorescent lighting systems, provide numerous advantages over conventional fluorescent lighting. The electrical power requirements for LED lighting are quite low in comparison to most other forms of lighting, thereby saving energy and increasing efficiency in comparison to other lighting forms. Moreover, the present system eliminates the need for relatively high step-up voltages, as it is not necessary to ionize gases within a tube, as is done in fluorescent lighting. This greatly reduces the potential hazard of such a system, as the voltage required is considerably lower than the conventional supply voltage (i.e., 110 to 115 volts) in most areas.

Another most important advantage of the present lighting system is that the potential danger of breakage of the relatively fragile, thin walled glass fluorescent tubes is eliminated. Even where a tubular LED lighting device is used in the present invention, the tube may be a transparent or translucent plastic, which is far less prone to breakage than a conventional fluorescent glass tube. Even in the event that such an LED replacement tube is cracked, it will still continue to function, as there is no containment of a gas under a relatively low pressure within the present lighting device. The use of solid translucent or transparent rod elements, provides an even sturdier and stronger lighting device which greatly increases safety in hazardous environments (fuel vapors, explosives, etc.).

The present LED replacement lighting system provides further benefits in terms of emergency lighting, which cannot be easily achieved using fluorescent lighting. The provision of a relatively low voltage battery backup, enables the present system to function as an emergency lighting system. Fluorescent lighting systems are not practicable for such emergency lighting, due to their high voltage and alternating current requirements. Moreover, the present LED system enables one to provide lighting of virtually any color or hue desired, by means of different colored LEDs as desired. The lighting intensity is easily varied as well by means of a conventional rheostat or similar device, which light intensity variation is not possible with fluorescent systems. Alternatively, the translucent tube or rod component may be treated by mixing a light scattering polymer or other substance with the acrylic or other plastic, at the time of manufacture. The resulting translucent material serves to scatter and diffuse the light output from the LEDs, and may be tinted as desired. Thus, the present LED replacement lighting for fluorescent lighting systems will prove most valuable to the lighting industry.

It is to be understood that the present invention is not limited to the embodiments described above, but encompasses any and all embodiments within the scope of the following claims.

We claim:

1. An LED lighting unit for replacing a conventional fluorescent tube between the opposed electrical receptacles of a conventional fluorescent lighting fixture, comprising:

a hollow, rigid, translucent tube having a first end and a second end opposite said first end;

a first end cap disposed upon said first end of said tube, and a second end cap disposed upon said second end of said tube;

a pair of parallel, fluorescent light fixture receptacle connectors extending from each said end cap, and configured for installing within the opposed electrical receptacles of the fluorescent lighting fixture;

a plurality of LEDs disposed within said tube, in electrical contact with one another and with at least said pair of connectors extending from at least one said end cap; and a reflective coating disposed circumferentially about at least a portion of said tube.

2. The LED lighting unit according to claim 1, wherein each of said LEDs is oriented having its light emissions directed toward said reflective coating.

3. The LED lighting unit according to claim 1, further including a step-down transformer for reducing supply voltage to a level compatible with said plurality of LEDs.

4. The LED lighting unit according to claim 3, wherein said transformer is contained between each said end cap of said tube.

5. The LED lighting unit according to claim 1, wherein said plurality of LEDs are electrically connected in series with one another.

6. The LED lighting unit according to claim 1, further including a tinted sleeve disposed about said tube.

7. The LED lighting unit according to claim 1, wherein at least some of said LEDs emit colored light when electrically actuated.

* * * * *